United States Patent
Hou et al.

(10) Patent No.: US 12,468,470 B2
(45) Date of Patent: Nov. 11, 2025

(54) DATA PROCESSING METHOD AND APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Siyu Hou, Beijing (CN); Long Qin, Beijing (CN); Zhaojun Wang, Beijing (CN); Yao Wang, Beijing (CN); Chaodong Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 158 days.

(21) Appl. No.: 18/540,824

(22) Filed: Dec. 14, 2023

(65) Prior Publication Data

US 2024/0211161 A1   Jun. 27, 2024

(30) Foreign Application Priority Data

Dec. 27, 2022   (CN) .......................... 202211690925.4

(51) Int. Cl.
*G06F 3/0481* (2022.01)
*G06F 3/06* (2006.01)
*G06F 3/04886* (2022.01)

(52) U.S. Cl.
CPC .......... *G06F 3/0647* (2013.01); *G06F 3/0481* (2013.01); *G06F 3/0604* (2013.01); *G06F 3/067* (2013.01); *G06F 3/04886* (2013.01)

(58) Field of Classification Search
CPC .... G06F 3/0647; G06F 3/0481; G06F 3/0604; G06F 3/067; G06F 3/04886
See application file for complete search history.

(56) References Cited

U.S. PATENT DOCUMENTS

| | | | | |
|---|---|---|---|---|
| 2011/0107194 A1* | 5/2011 | Cui | ....................... | G06F 16/382 |
| | | | | 715/810 |
| 2024/0195847 A1* | 6/2024 | Mourachov | ......... | H04L 65/1089 |
| 2024/0289704 A1* | 8/2024 | Kang | ..................... | G06F 9/453 |

FOREIGN PATENT DOCUMENTS

CN   114445019 A   5/2022

OTHER PUBLICATIONS

Radek Holy et al., Electronic flow document in the university environment using public-key infrastructure, May 1, 2015, International Symposium on Next-Generation Electronics (ISNE), pp. 1-6 (Year: 2015).*

Qiaoying Tang et al., A Simplified Document Flow System, Aug. 1, 2012, International Conference on Automation and Logistics, pp. 474-477 (Year: 2012).*

* cited by examiner

*Primary Examiner* — Tam T Tran
(74) *Attorney, Agent, or Firm* — BakerHostetler

(57) ABSTRACT

The present disclosure provides a data processing method and apparatus, an electronic device, a storage medium, and a program product. The data processing method includes: displaying a first window at a first position of a first document in response to receiving a triggering operation on a first control in the first document, wherein the first window includes an approval flow list; and displaying approval flow information of a first approval flow at the first position of the first document in response to receiving a selection operation on the first approval flow in the approval flow list.

20 Claims, 7 Drawing Sheets

--- in response to receiving a triggering operation on a first control in a first document, a first window at a first position of the first document is displayed, where the first window includes an approval flow list;    S101

↓ in response to receiving a selection operation on a first approval flow in the approval flow list, approval flow information of the first approval flow is displayed at the first position of the first document    S102

DATA PROCESSING METHOD AND APPARATUS, ELECTRONIC DEVICE, STORAGE MEDIUM, AND PROGRAM PRODUCT

This application claims the priority of Chinese Patent Application No. 202211690925.4 filed on Dec. 27, 2022, the disclosure of which is incorporated by reference herein in its entirety as part of the present application.

TECHNICAL FIELD

The present disclosure relates to the technical field of computers, and in particular, to a data processing method and apparatus, an electronic device, a storage medium, and a program product.

BACKGROUND

With the popularity of networks and the development of network techniques, a cloud service function has been gradually applied in people's life and work. By utilizing the cloud service function, a user can migrate a document saved on a client to a cloud server to form a cloud document, and thus can invoke and process the cloud document saved on the cloud server anytime anywhere.

At present, when a certain approval flow needs to be shown in a cloud document, the approval flow can only be plotted or an image of the approval flow is inserted in the cloud document. However, such a way is inconvenient for a user to operate, and once the original approval flow changes, corresponding approval flow information also needs to be modified in the cloud document, bringing inconvenience for the user in use.

SUMMARY

In view of the above problem, an objective of the present disclosure is to provide a data processing method and apparatus, an electronic device, a storage medium, and a program product.

For the above purposes, a first aspect of the present disclosure provides a data processing method, including:
  displaying a first window at a first position of a first document in response to receiving a triggering operation on a first control in the first document, wherein the first window includes an approval flow list; and
  displaying approval flow information of a first approval flow at the first position of the first document in response to receiving a selection operation on the first approval flow in the approval flow list.

In some embodiments, before the receiving the triggering operation on the first control in the first document, further including:
  displaying a second control at a second position in the first document in response to receiving a triggering operation on the first position in the first document, wherein the second position is adjacent to the first position; and
  displaying the first control or a first list including the first control in the first document in response to receiving a triggering operation on the second control.

In some embodiments, the approval flow information includes an approval rule table or an approval rule flowchart; the approval rule table presents approval rule information of the first approval flow in a tabular form; the approval rule flowchart presents the approval rule information of the first approval flow in a flowchart form; and
  the approval rule information includes at least one selected from the group consisting of an approval sequence, an approval role, an approver, an approval type, or an approval condition.

In some embodiments, a third control is further displayed in the first document, and the data processing method further includes:
  canceling displaying the approval rule table and displaying the approval rule flowchart at the first position in response to displaying the approval rule table at the first position and receiving a triggering operation on the third control;
  or,
  canceling displaying the approval rule flowchart and displaying the approval rule table at the first position in response to displaying the approval rule flowchart at the first position and receiving the triggering operation on the third control.

In some embodiments, the approval flow list includes at least one approval flow preset in an approval system.

In some embodiments, the first window includes an input box; the data processing method further includes:
  obtaining input information and displaying one or more approval flows matching the input information in the approval flow list based on the input information in response to receiving an input operation on the input box.

In some embodiments, the data processing method further including:
  highlighting, in the approval flow list, information matching the input information in one or more approval flows.

In some embodiments, the data processing method further including:
  displaying, in the approval flow list, a name, a creator, and an editing time of the approval flow.

In some embodiments, the data processing method further including:
  adding a second approval flow to the approval flow list and storing the second approval flow in an approval system in response to receiving an addition operation on the approval flow list.

In some embodiments, the data processing method further including:
  displaying a fourth control in the first document in response to a current user of the first document having an editing authority for the first approval flow; and
  displaying an editing page of the first approval flow in response to receiving a triggering operation on the fourth control, wherein the editing page is used to implement an editing operation on the first approval flow.

In some embodiments, the data processing method further including:
  modifying the approval flow information in the first document and the approval flow information in an approval system based on an operation result of the editing operation in response to receiving the editing operation on the first approval flow in the editing page.

In some embodiments, the data processing method further including:
  displaying a fifth control in the first document in response to a current user of the first document having an application authority for the first approval flow; and displaying an application page of the first approval flow in response to receiving a triggering operation on the fifth control, wherein the application page is used to implement an initiating application operation on the first approval flow.

In some embodiments, the data processing method further including:

displaying a fifth control in the first document; and displaying the application page of the first approval flow in response to receiving a triggering operation on the fifth control and a current user of the first document having the application authority for the first approval flow, wherein the application page is used to implement an initiating application operation on the first approval flow.

In some embodiments, the data processing method further including:

modifying the approval flow information in the first document and the approval flow information in an approval system based on an operation result of the initiating application operation in response to receiving the initiating application operation on the first approval flow in the application page.

A second aspect of the present disclosure provides a data processing apparatus, including:

a window display module configured to: display a first window at a first position of a first document in response to receiving a triggering operation on a first control in the first document, wherein the first window includes an approval flow list; and an approval flow display module configured to: display approval flow information of a first approval flow at the first position of the first document in response to receiving a selection operation on the first approval flow in the approval flow list.

A third aspect of the present disclosure provides an electronic device, including a memory, a processor, and a computer program stored on the memory and executable on the processor, wherein the processor, when executing the computer program, implements the data processing method as described in the first aspect of the present disclosure.

A fourth aspect of the present disclosure provides a non-transitory computer-readable storage medium storing computer instructions, wherein the computer instructions are used for causing a computer to execute the data processing method as described in the first aspect of the present disclosure.

A fifth aspect of the present disclosure provides a computer program product, including computer program instructions, the computer program instructions, when executed on a computer, cause the computer to execute the data processing method as described in the first aspect of the present disclosure.

As can be seen from the foregoing description, the data processing method and apparatus, the electronic device, the storage medium, and the program product provided in the present disclosure allow for displaying the first window in the first document by means of the triggering operation on the first control. Moreover, the approval flow list is displayed in the first window, and the approval flow information of the first approval flow in the approval flow list is displayed in the first document by means of the selection operation on the approval flow list. Thus, the approval flow can be quickly inserted in the first document, facilitating use by a user.

BRIEF DESCRIPTION OF THE DRAWINGS

To describe the technical solutions in the present disclosure more clearly, the accompanying drawings needed in describing the embodiments will be briefly described below. Apparently, the accompanying drawings in the following description show merely some embodiments of the present disclosure, and other drawings can be derived from the accompanying drawings by those of ordinary skill in the art without creative efforts.

DETAILED DESCRIPTION

To make the objectives, technical solutions, and advantages of the present disclosure clearer and more comprehensible, the present disclosure is described in further detail below with reference to specific embodiments and accompanying drawings.

It should be noted that, unless otherwise defined, the technical and scientific terms used in the present disclosure are as they are usually understood by those skilled in the art to which the disclosure pertains. "First", "second", and similar words used in the embodiments of the present disclosure do not denote any order, quantity, or importance, but are merely intended to distinguish between different constituents. "Comprising", "including", and similar words mean that elements or articles appearing before "comprising" or "including" include the elements or articles and their equivalent elements appearing behind "comprising" or "including", not excluding any other elements or articles. "Connecting", "connected", and similar words are not restricted to physical or mechanical connections, but may include electrical connections, whether direct or indirect. "Upper", "lower", "left", "right", and the like are used merely to indicate a relative positional relationship, and when the absolute position of the described object is changed, the relative positional relationship is also changed accordingly.

Figure 1A:
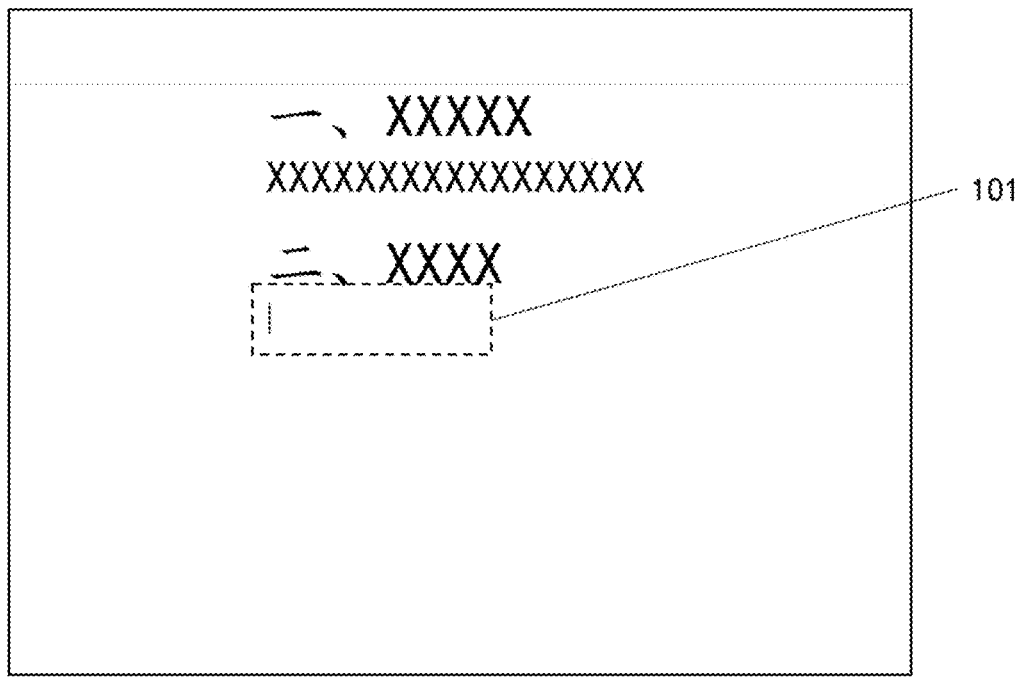
FIG. 1A illustrates a schematic diagram of one exemplary page according to an embodiment of the present disclosure.

FIG. 1A illustrates a schematic diagram of one exemplary page 100 according to an embodiment of the present disclosure.

As shown in FIG. 1A, the page 100 illustrates at least part of a page in a first document. In some embodiments, the first document may be a document that allows collaborative editing by a plurality of persons, such as a cloud document and an online document. The first document is set on a first system capable of providing a cloud document service.

When there is a need for inserting an approval flow at a first position 101 of the first document, a triggering operation is performed on the first position 101 by a mouse click, mouse hovering, touch, or the like, and the first position 101 is focused.

Figure 1B:
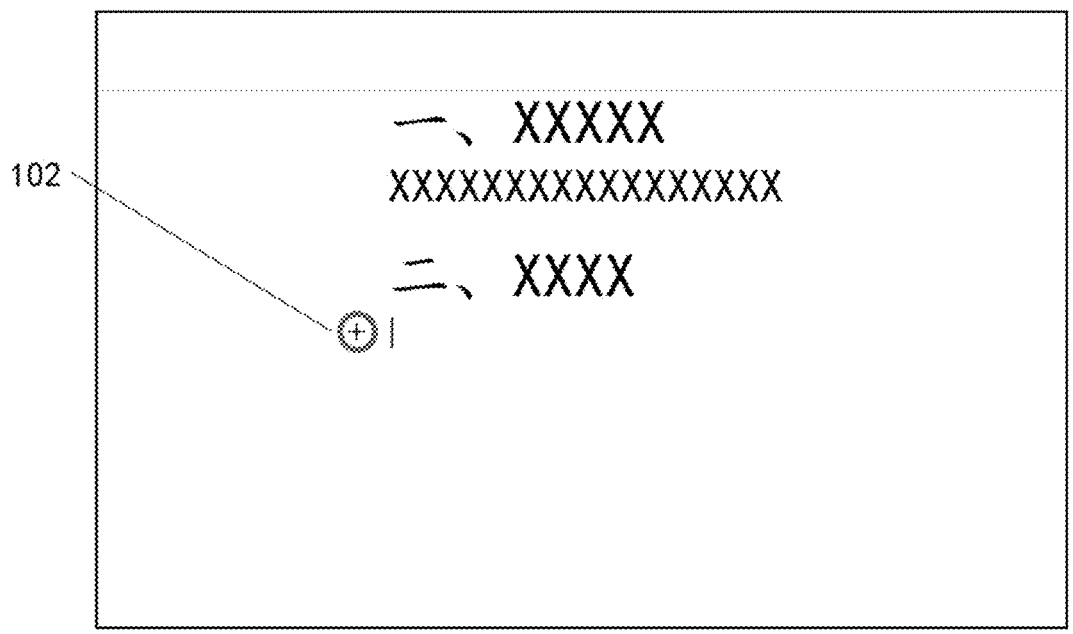
FIG. 1B illustrates a schematic diagram of one exemplary page according to an embodiment of the present disclosure.

As shown in FIG. 1B, after the triggering operation is performed on the first position 101, a second control 102 is displayed at a second position of the first document. The second position is adjacent to the first position 101. For example, the second position and the first position 101 are in a same row in the first document, which will not be limited in the present embodiment. When a certain row in the first document is triggered, the second control 102 is displayed; conversely, the second control 102 is hidden, thereby avoiding that the page of the first document is too disordered and thus affects the use by a user.

Figure 1C:
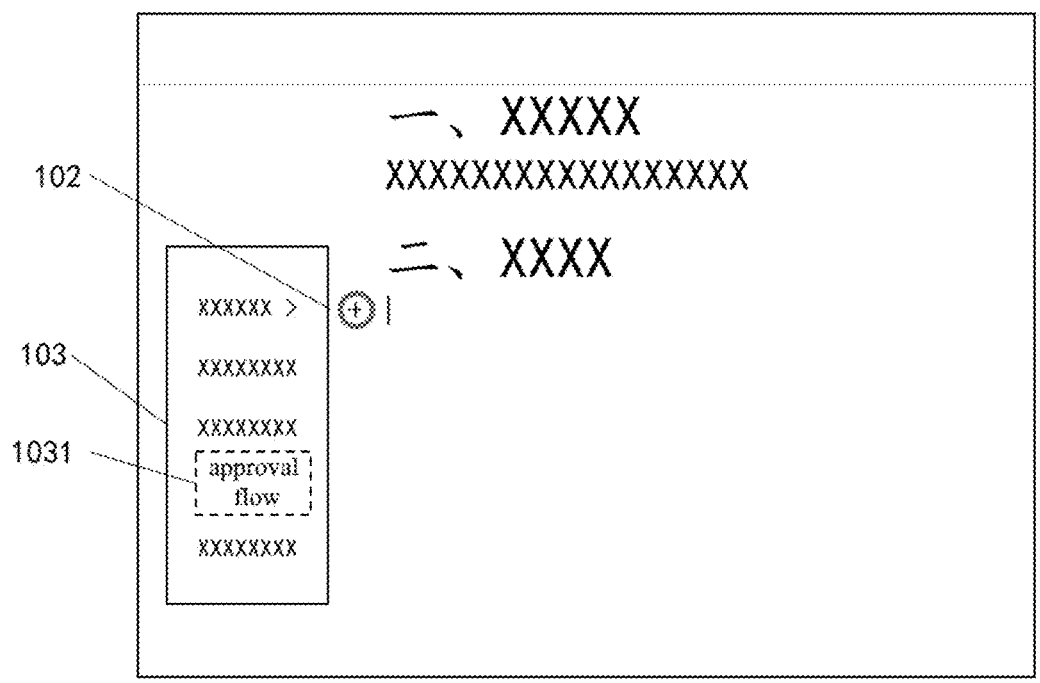
FIG. 1C illustrates a schematic diagram of one exemplary page according to an embodiment of the present disclosure.

As shown in FIG. 1C, when a user performs a triggering operation on the second control 102 by a mouse click, mouse hovering, touch, or the like, the first document displays a first control 1031 in a preset region of the first document in response to the received triggering operation on the second control 102; or, the first document displays a first list 103 including the first control 1031 in the preset region of the first document in response to the received triggering operation on the second control 102. In the present embodiment, after the second control 102 is triggered, the first control 1031 is displayed on the page of the first document; conversely, the first control 1031 is not displayed, thereby avoiding that the page of the first document is too disordered and thus affects the use by the user.

Figure 1D:
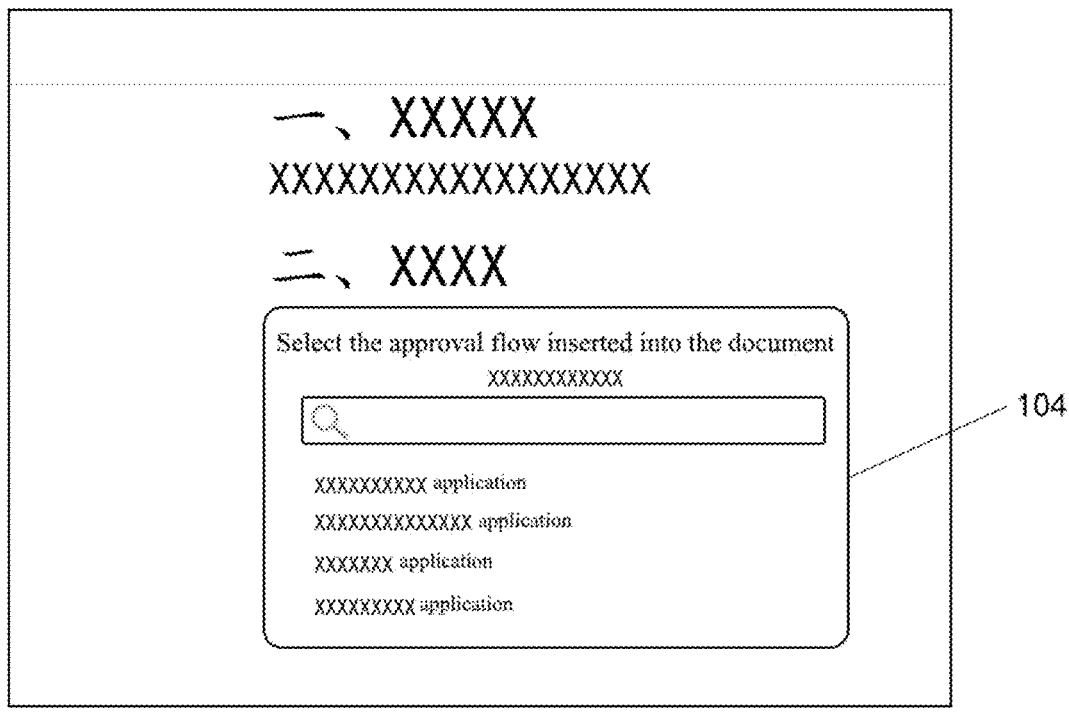
FIG. 1D illustrates a schematic diagram of one exemplary page according to an embodiment of the present disclosure.

As shown in FIG. 1D, when the user performs the triggering operation on the first control 1031 by a mouse click, mouse hovering, touch, or the like, the first document displays a first window 104 at the first position 101 of the first document in response to the received triggering operation on the first control 1031. An input box 1041 and an approval flow list are displayed in the first window 104, and at least one approval flow may be displayed in the approval flow list. The approval flow displayed in the approval flow list may be an approval flow preset in an approval system, or may be an approval flow added to the approval flow list by an addition operation on the approval flow list, which will not be limited in the present embodiment. When an approval flow is added to the approval flow list by performing the addition operation on the approval flow list, the new added approval flow will be synchronously stored in the approval system to guarantee the consistency of the approval flow list with the approval flows displayed in the approval system. The first window 104 may further include a closing control for canceling displaying the first window 104. When the user triggers the closing control, displaying the first window 104 may be canceled. Thus, the problem caused by a misoperation of the user is solved.

The approval system is a system that provides an approval service. A user may cerate approval flows meeting various requirements, such as a leave approval flow, a business trip approval flow, and a reimbursement approval flow, on the approval system, and set a scope of users allowed to apply for each approval flow. After an approval flow is created, a user having an application authority may apply for approval in the approval system, and an approver may approve based on an approval condition edited for each approval flow.

In some embodiments, the approval system and a first system for providing the first document may be set on a same system as two different functions or subsystems, e.g., a cloud document function module and an approval function module set in a same office software system; or, the approval system and the first system for providing the first document are two different systems, e.g., the cloud document function module set in office software and the approval function module set in a project management system, which will not be limited in the present embodiment.

In the present embodiment, the first system where the first document resides may realize data transmission with the approval system through a communication interface. The first system where the first document resides may be in communication connection with one approval system so that the approval flows of one approval system can be displayed in the approval flow list in the first window 104; or, the first system where the first document resides may be in communication connection with a plurality of approval systems so that the approval flows of the plurality of approval systems can be displayed in the approval flow list in the first window 104, which will not be limited in the present embodiment.

In the present embodiment, if there is no created approval flow in the approval system, the approval flow cannot be displayed in the first window 104. Therefore, first prompt information for informing a user of no approval flow existing is displayed at a preset position (e.g., the approval flow list is not displayed, at the position of the approval flow list) in the first window 104. The first prompt information may be "No flow".

In the present embodiment, if an approval flow in the approval system cannot be displayed in the first window 104 for reasons such as network transmission, second prompt information for informing a user of failing to load the approval flow is displayed at the preset position (e.g., the approval flow list is not displayed, at the position of the approval flow list) in the first window 104. The second prompt information may be "Fail to load, please try again". If a user clicks on the second prompt information, the approval flow displayed in the first window 104 may be loaded again.

In some embodiments, information such as a name, a creator, and an editing time of the approval flow is further displayed in the approval flow list so that a user can find the desired approval flow quickly.

In some embodiments, when the approval flow list includes a plurality of approval flows, the approval flows in the approval flow list may be ranked in a preset order, e.g., in an editing order from new to old or in an alphabetical order of names of approval flows, which will not be limited in the present embodiment.

Figure 1E:
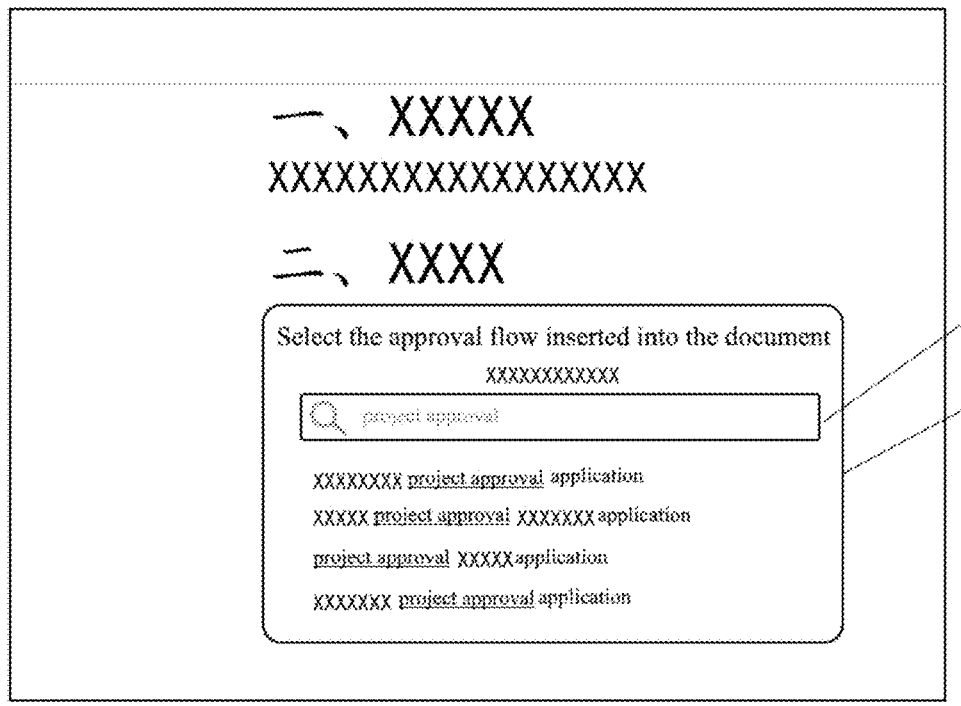
FIG. 1E illustrates a schematic diagram of one exemplary page according to an embodiment of the present disclosure.

In some embodiments, the first window 104 further includes an input box 1041. The input box 1041 may be configured to search for an approval flow. As shown in FIG. 1E, when a user inputs a content in the input box 1041, the first document obtains input information in the input box 1041 in response to receiving an input operation on the input box 1041, and screens approval flows based on the input information. Thus, only the one or more approval flows matching the input information is displayed in the approval flow list so that the user can find the desired approval flow conveniently. For example, when the user inputs "project approval" in the input box 1041, only the approval flows with names containing "project approval" will be displayed in the approval flow list, and other approval flows will not be displayed. When there is no approval flow matching the input information in the input box 1041, third prompt information for informing the user of no approval flow searched is displayed at the preset position (e.g., the approval flow list is not displayed, at the position of the approval flow list) in the first window 104. The third prompt information may be "No search result".

In some embodiments, when the one or more approval flows matching the input information is displayed in the approval flow list, information matching the input information in the approval flow may be highlighted. For example, when the user inputs "project approval" in the input box 1041, "project approval" in the name of the approval flow displayed in the one or more approval flows list will be highlighted so that the user can find the desired approval flow conveniently.

When the user finds the desired approval flow in the approval flow list, e.g., when the user finds the desired first approval flow, the user performs the selection operation on the first approval flow to display the approval flow information of the first approval flow in the first document.

The first approval flow may include only one approval flow, and in this case, the selection operation on the first approval flow is a single selection operation. Alternatively, a plurality of approval flows may also be included, and in this case, the selection operation on the first approval flow is a multi-selection operation, which will not be limited in the present embodiment.

In the present embodiment, when the user hovers the mouse over the first approval flow, the first approval flow is highlighted in the approval flow list to inform the user of the first approval flow being to be selected.

Figure 1F:
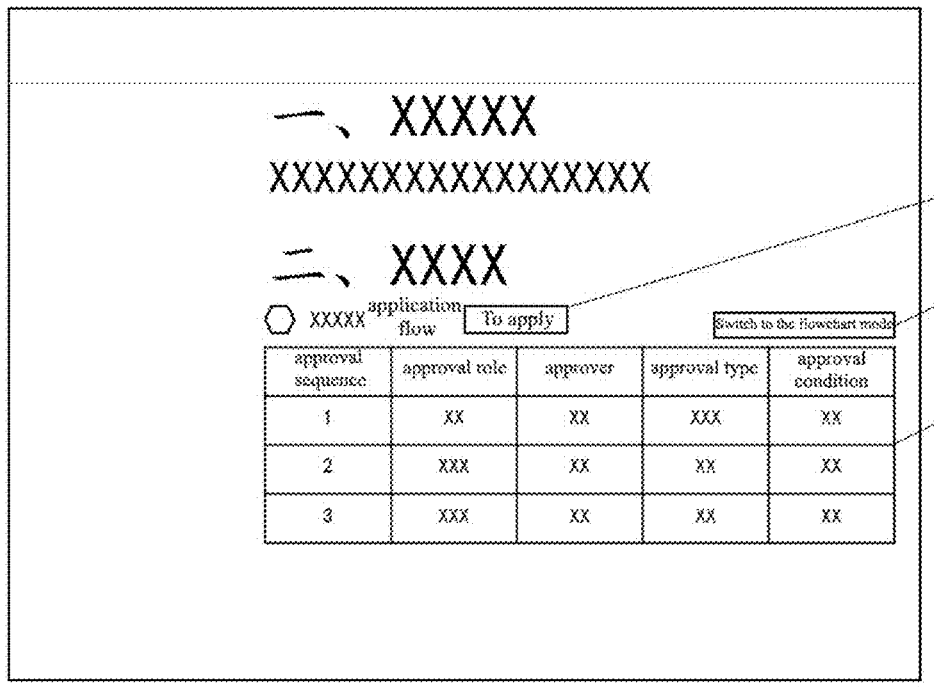
FIG. 1F illustrates a schematic diagram of one exemplary page according to an embodiment of the present disclosure.
Figure 1G:
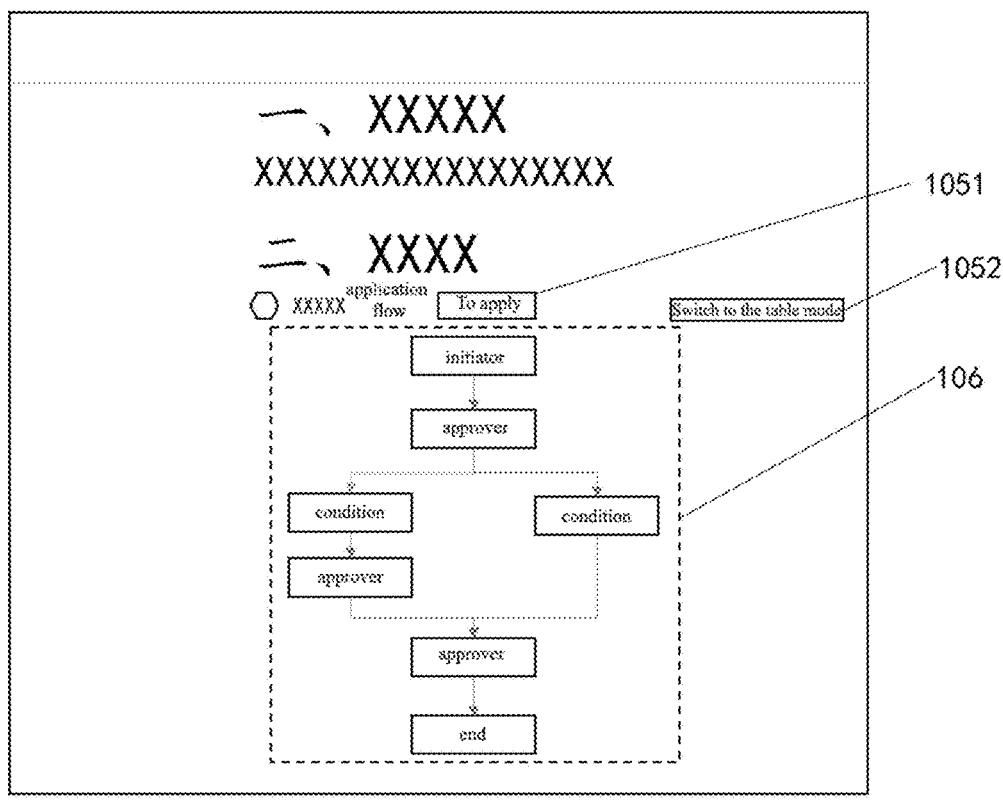
FIG. 1G illustrates a schematic diagram of one exemplary page according to an embodiment of the present disclosure.

As shown in FIG. 1F and FIG. 1G, when the user performs the selection operation on the first approval flow by a mouse click, touch, or the like, the first document displays the approval flow information of the first approval flow at the first position of the first document in response to receiving the selection operation on the first approval flow.

Alternatively, when the approval flow information of the first approval flow is displayed in the first document, displaying the first window 104 may be canceled, or the first 104 may be displayed continuously, which will not be limited in the present embodiment.

In some embodiments, as shown in FIG. 1F, the approval flow information includes an approval rule table that presents the approval rule information of the first approval flow in a tabular form; alternatively, as shown in FIG. 1G, the approval flow information includes an approval rule flowchart that presents the approval rule information of the first approval flow in a flowchart form. The approval rule information includes at least one selected from the group consisting of an approval sequence, an approval role, an approver, an approval type, or an approval condition.

In the present embodiment, after the first document obtains the approval flow information corresponding to the first approval flow in the approval system, the obtained approval flow information is presented in the form of the approval rule table or the approval rule flowchart so that different users can select the suitable manners to view the approval flow information. The approval flow information may further include a name of the first approval flow displayed at a preset position (e.g., above the approval rule table or the approval rule flowchart) of the first document.

Figure 2A:
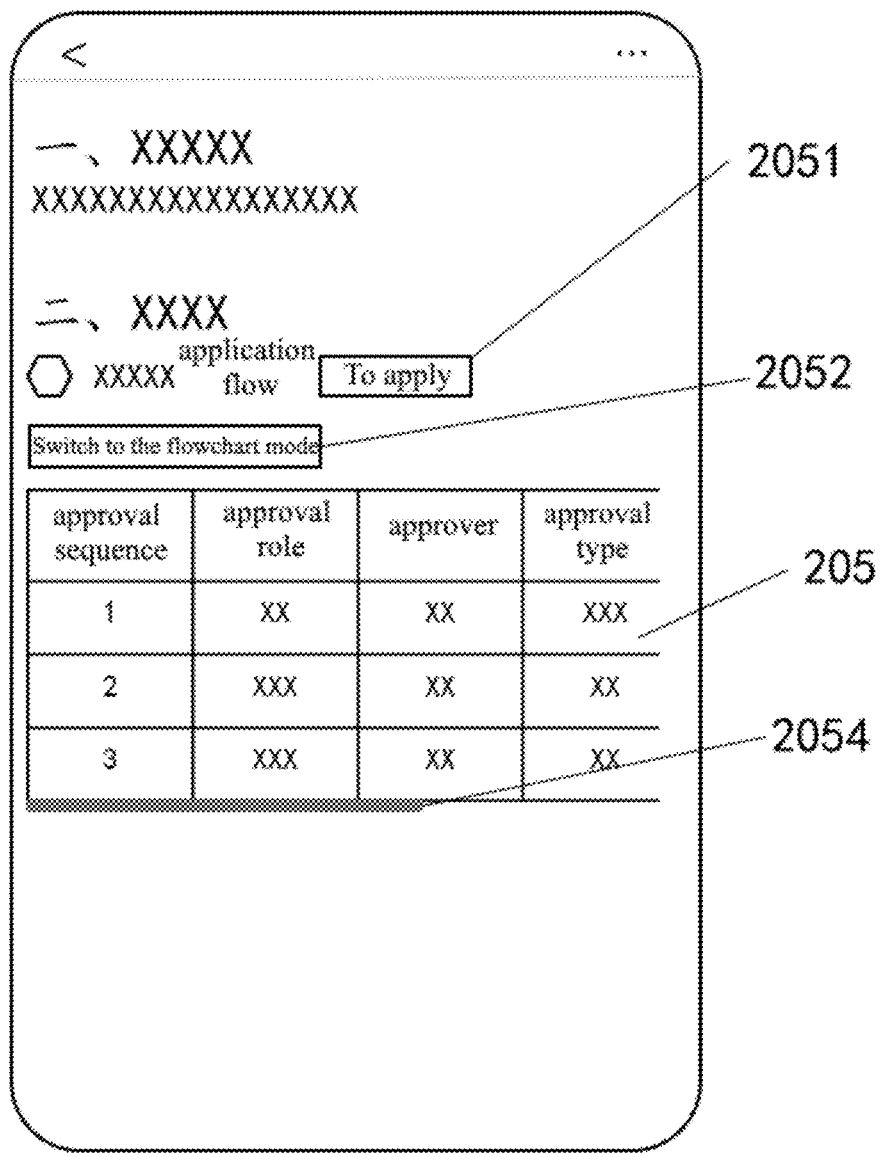
FIG. 2A illustrates a schematic diagram of one exemplary page according to an embodiment of the present disclosure.
Figure 2B:
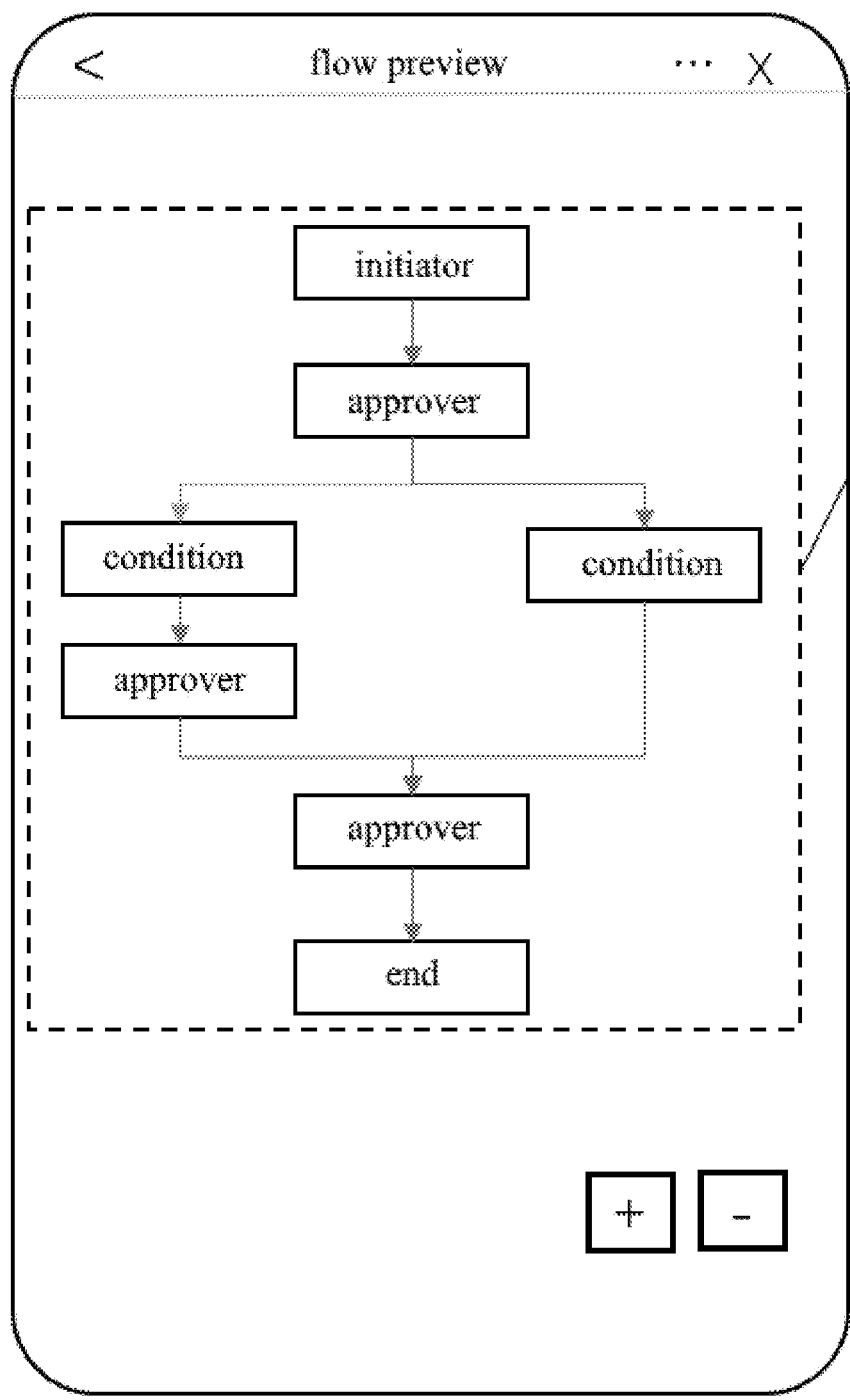
FIG. 2B illustrates a schematic diagram of one exemplary page according to an embodiment of the present disclosure.

In some embodiments, at the same time of displaying the approval flow information, a third control 1052 may be displayed at the preset position in the first document. The third control 1052 is configured to realize switching between the approval rule table 105 and the approval rule flowchart 106. As shown in FIG. 1F and FIG. 1G, the third control 1052 may be displayed over the approval rule table 105 and the approval rule flowchart 106 and displayed in the same row with the name of the first approval flow; or, as shown in FIG. 2A, the third control 1052 may be displayed between the name of the first approval flow and the approval rule table 105 and the approval rule flowchart 106, which will not be limited in the present embodiment.

In the present embodiment, when the approval rule table 105 is displayed at the first position 101 of the first document, fourth prompt information for prompting a user to switch from the approval rule table 105 to the approval rule flowchart 106 is displayed on the third control 1052. The fourth prompt information may be "Switch to the flowchart mode". In this case, if the user performs a triggering operation on the third control 1052, the first document, in response to receiving the triggering operation on the third control 1052, cancels displaying the approval rule table 105 and displays the approval rule flowchart 106 at the first position 101, thereby realizing switching from the approval rule table 105 to the approval rule flowchart 106.

When the approval rule flowchart 106 is displayed at the first position 101 of the first document, fifth prompt information for prompting a user to switch from the approval rule flowchart 106 to the approval rule table 105 is displayed on the third control 1052. The fifth prompt information may be "Switch to the table mode". In this case, if the user performs the triggering operation on the third control 1052, the first document, in response to receiving the triggering operation on the third control 1052, cancels displaying the approval rule flowchart 106 and displays the approval rule table 105 at the first position 101, thereby realizing switching from the approval rule flowchart 106 to the approval rule table 105.

In the present embodiment, when the approval flow information is inserted for the first time, the approval flow information 105 may be displayed first and then switching from the approval rule table 105 to the approval rule flowchart 106 is realized by means of the third control 1052; or, when the approval flow information is inserted for the first time, the approval rule flowchart 106 is displayed first and then switching from the approval rule flowchart 106 to the approval rule table 105 is realized by means of the third control 1052, which will not be limited in the present embodiment.

Figure 1H:
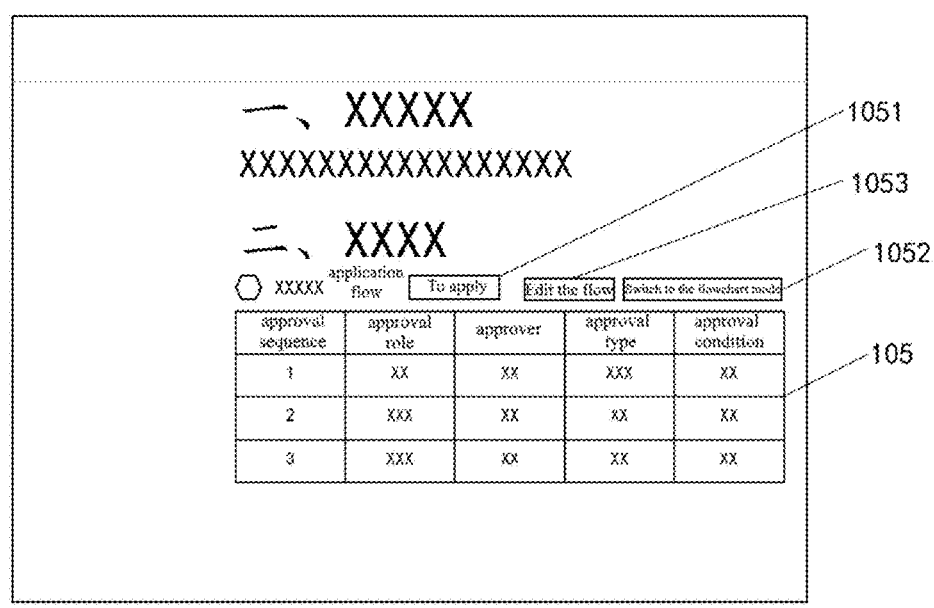
FIG. 1H illustrates a schematic diagram of one exemplary page according to an embodiment of the present disclosure.

In some embodiments, as shown in FIG. 1H, when the current user of the first document has an editing authority for the first approval flow, a fourth control 1053 is displayed at a preset position (e.g., above the approval rule flowchart 106 or the approval rule table 105) of the first document. The current user of the first document may be a creator of the first document, or may be a user having an editing authority for the first document, or may also be a user having only an authority of browsing the first document, which will not be limited in the present embodiment.

Meanwhile, when the first approval flow is set in the approval system, users having an authority of editing the approval flow may be set therefor. After the first approval flow is inserted in the first document, whether the users having the authority of editing the approval flow include the current user of the first document may be determined; if yes, i.e., the users having the authority of editing the approval flow include the current user of the first document, the current user of the first document has the editing authority for the first approval flow and the fourth control 1053 will be displayed in the first document; if no, i.e., the users having the authority of editing the approval flow do not include the current user of the first document, the current user of the first document has no editing authority for the first approval flow and the fourth control 1053 will not be displayed in the first document, avoiding misunderstanding by the user. The fourth control 1053 may display sixth prompt information for prompting a user to edit the approval flow. The sixth prompt information may be "Edit the flow".

When the current user of the first document has the editing authority for the first approval flow, the current user may enter an editing page of the first approval flow through the fourth control 1053, where the editing page is used to implement an editing operation on the first approval flow. When the triggering operation is performed on the fourth control 1053 by a mouse click, touch, or the like, the first document, in response to the triggering operation on the fourth control 1053, displays the editing page of the first approval flow over the first document. The editing page of the first approval flow may be set to an editing page over the first document or may be an editing page for editing the first approval flow in the approval system, which will not be limited in the present embodiment.

After entering the editing page of the first approval flow, the user may perform the editing operation on the first approval flow through the editing page, and the first system, in response to receiving the editing operation on the first approval flow in the editing page, modifies the approval flow information in the first document and approval flow information in the approval system based on an operation result of the editing operation, thereby guaranteeing the consistency of the approval flow information of the first approval flow in the first document and in the approval system.

In some embodiments, when the first approval flow is set in the approval system, users having an authority of applying for the approval flow may be set therefor. After the first approval flow is inserted in the first document, whether the users having the authority of applying for the approval flow include the current user of the first document may be determined; if yes, i.e., the users having the authority of applying for the approval flow include the current user of the first document, the current user of the first document has an application authority for the first approval flow and the fifth control 1051 will be displayed in the first document; if no, i.e., the users having the authority of applying for the approval flow do not include the current user of the first document, the current user of the first document has no application authority for the first approval flow and the fifth control 1051 will not be displayed in the first document, avoiding misunderstanding by the user. The fifth control 1051 may display seventh prompt information for prompting a user to apply for the approval flow. The seventh prompt information may be "To apply".

When the current user of the first document has the application authority for the first approval flow, the current user may enter an application page of the first approval flow through the fifth control 1051, where the application page is used to implement an initiating application operation on the first approval flow. When a triggering operation is performed on the fifth control 1051 by a mouse click, touch, or the like, the first document, in response to receiving the triggering operation on the fifth control 1051, displays the application page of the first approval flow over the first document. The application page of the first approval flow may be set to an application page over the first document or may be an editing page for applying for the first approval flow in the approval system, which will not be limited in the present embodiment.

After entering the application page of the first approval flow, the user may perform the initiating application operation on the first approval flow through the application page, and the first system, in response to receiving the initiating application operation on the first approval flow in the application page, modifies the approval flow information in the first document and the approval flow information in the approval system based on an operation result of the initiating application operation, thereby guaranteeing the consistency of the approval flow information of the first approval flow in the first document and in the approval system.

In some embodiments, the fifth control 1051 may also be directly displayed in the first document. When the first system receives the triggering operation on the fifth control 1051 and the current user of the first document has the application authority for the first approval flow, an approval application page of the first approval flow is displayed. when the first system receives the triggering operation on the fifth control 1051 and the current user of the first document has no application authority for the first approval flow, an error page is displayed. The error page includes eighth prompt information for prompting a user that the user has no application authority. The eighth prompt information may be "Sorry, you have no application authority".

Figure 3:
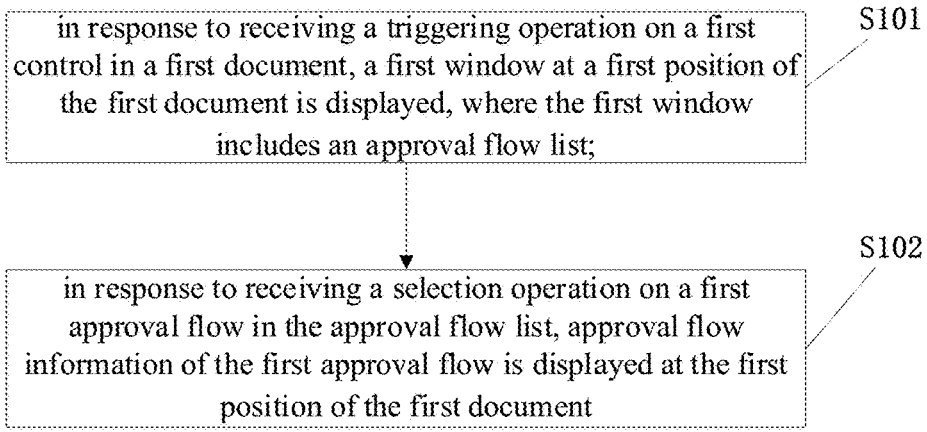
FIG. 3 illustrates a flowchart of an exemplary method provided in an embodiment of the present disclosure.

An embodiment of the present disclosure further provides a data processing method. As shown in FIG. 3, the data processing method includes the following steps.

Step S101, in response to receiving a triggering operation on a first control in a first document, a first window at a first position of the first document is displayed, where the first window includes an approval flow list.

Step S102, in response to receiving a selection operation on a first approval flow in the approval flow list, approval flow information of the first approval flow is displayed at the first position of the first document.

In the present embodiment, the first window may be displayed in the first document by means of the triggering operation on the first control. Moreover, the approval flow list is displayed in the first window, and the approval flow information of the first approval flow in the approval flow list is displayed in the first document by means of the selection operation on the approval flow list. Thus, the approval flow can be quickly inserted in the first document, facilitating use by a user.

In some embodiments, the approval flow list includes at least one approval flow preset in an approval system. That is, in the present embodiment, the approval flow displayed in the approval flow list may be an approval flow preset in the approval system. That is, the existing approval flow in the approval system may be displayed in the first window, and a user may select the desired approval flow in the first window and display the corresponding approval flow information in the first document so as to insert the approval flow in the first document. Thus, the use by the user is facilitated. Meanwhile, since the approval flow information directly comes from the approval system, when the approval flow information of the corresponding approval flow in the approval system changes, the approval flow information in the first document may change accordingly. As a result, the consistency of the same approval flow in the first document and in the approval system is guaranteed without increasing an extra operation, facilitating use by the user.

In some embodiments, the data processing method further includes: adding a second approval flow to the approval flow list and storing the second approval flow in the approval system in response to receiving an addition operation on the approval flow list. In the present embodiment, an approval flow may be added to the approval flow list by performing the addition operation on the approval flow list, and meanwhile, the new added approval flow is synchronously stored in the approval system. That is, an addition entry for an approval flow is provided in the first document and the consistency of the approval flow list with the approval flows displayed in the approval system can be guaranteed, facilitating use by the user.

In some embodiments, before the receiving the triggering operation on the first control in the first document in step S101, the following steps are further included.

Step S201, in response to receiving a triggering operation on the first position in the first document, a second control is displayed at a second position in the first document, where the second position is adjacent to the first position.

Step S203, in response to receiving a triggering operation on the second control, the first control or a first list including the first control is displayed in the first document.

In the present embodiment, when the first position is not triggered, i.e., when the user does not want to insert an approval flow, the first control is hidden, thereby avoiding that the page of the first document is too disordered and thus affects the use by the user. When the first position is triggered, i.e., when the user wants to insert an approval flow, the first control may be displayed by means of the triggering operation on the second control.

In some embodiments, the approval flow information includes an approval rule table or an approval rule flowchart;
  the approval rule table presents approval rule information of the first approval flow in a tabular form;
  the approval rule flowchart presents the approval rule information of the first approval flow in a flowchart form; and
  the approval rule information includes at least one selected from the group consisting of an approval sequence, an approval role, an approver, an approval type, or an approval condition.

In the present embodiment, the approval flow information may be displayed in the tabular form or may be displayed in the flowchart form, thereby meeting the requirements of different users.

In some embodiments, a third control is further displayed in the first document; and the data processing method further includes:
  canceling displaying the approval rule table, and displaying the approval rule flowchart at the first position in response to displaying the approval rule table at the first position and receiving a triggering operation on the third control;
  or,
  canceling displaying the approval rule flowchart, and displaying the approval rule table at the first position in response to displaying the approval rule flowchart at the first position and receiving the triggering operation on the third control.

In the present embodiment, switching between the approval rule table and the approval rule flowchart may be realized through the third control, thereby meeting the requirements of different users.

In some embodiments, the first window includes an input box; and the data processing method further includes: in response to receiving an input operation on the input box, obtaining input information, and displaying the one or more approval flows matching the input information in the approval flow list based on the input information.

In the present embodiment, a search function for an approval flow may be realized by means of the input box so that a user can find the desired approval flow rapidly, thereby facilitating use by the user.

In some embodiments, the data processing method further includes: highlighting, in the approval flow list, information matching the input information in the one or more approval flows. Thus, the user can find the desired approval flow conveniently.

In some embodiments, the data processing method further includes: displaying, in the approval flow list, a name, a creator, and an editing time of the approval flow. Thus, the user can find the desired approval flow conveniently.

In some embodiments, the data processing method further includes the following steps.

Step S301, in response to a current user of the first document having an editing authority for the first approval flow, a fourth control is displayed in the first document.

Step S303, in response to receiving a triggering operation on the fourth control, an editing page of the first approval flow is displayed, where the editing page is used to implement an editing operation on the first approval flow.

In some embodiments, the data processing method further includes: in response to receiving the editing operation on the first approval flow in the editing page, modifying the approval flow information in the first document and approval flow information in the approval system based on an operation result of the editing operation.

In the present embodiment, when the current user of the first document has the editing authority for the approval flow, the current user may directly edit the first approval flow on the first document, and an editing result will be synchronized to the first document and the approval system. The operation of the user is facilitated and the consistency of the same approval flow in the first document and in the approval system is guaranteed.

In some embodiments, the data processing method further includes the following steps.

Step S401, in response to the current user of the first document having an application authority for the first approval flow, a fifth control is displayed in the first document.

Step S403, in response to receiving a triggering operation on the fifth control, an application page of the first approval flow is displayed, where the application page is used to implement an initiating application operation on the first approval flow.

In some embodiments, the data processing method further includes the following steps.

Step S501, the fifth control is displayed in the first document.

Step S503, in response to receiving the triggering operation on the fifth control and the current user of the first document having the application authority for the first approval flow, the application page of the first approval flow is displayed, where the application page is used to implement the initiating application operation on the first approval flow.

In some embodiments, the data processing method further includes:
  in response to receiving the initiating application operation on the first approval flow in the application page, modifying the approval flow information in the first document and the approval flow information in the approval system based on an operation result of the initiating application operation.

In the present embodiment, when the current user of the first document has the application authority for the approval flow, the current user may directly apply for the first approval flow on the first document, and an application result will be synchronized to the first document and the approval system. The operation of the user is facilitated and the consistency of the same approval flow in the first document and in the approval system is guaranteed.

It needs to be noted that the data processing method in the embodiments of the present disclosure may be performed by a single device, e.g., a computer or a server. The data processing method in the present embodiment may also be applied in a distributed scenario and completed by a plurality of devices in cooperation with one another. In such a distributed scenario, one of the plurality of devices may perform one or more steps of the data processing method in the embodiments of the present disclosure. The plurality of devices may interact with one another to complete the data processing method.

It needs to be noted that some embodiments of the present disclosure have been described above. Other embodiments fall within the scope of the appended claims. In some cases, the actions or steps described in the claims may be performed in sequences different from those in the foregoing embodiments and still achieve expected results. In addition, the processes depicted in the accompanying drawings do not necessarily require the specific orders or sequential orders shown for achieving the expected results. In some embodiments, multitasking and parallel processing are also possible or may be advantageous.

Based on the same inventive concept, corresponding to the data processing method in any foregoing embodiment, the present disclosure further provides a data processing apparatus.

Figure 4:
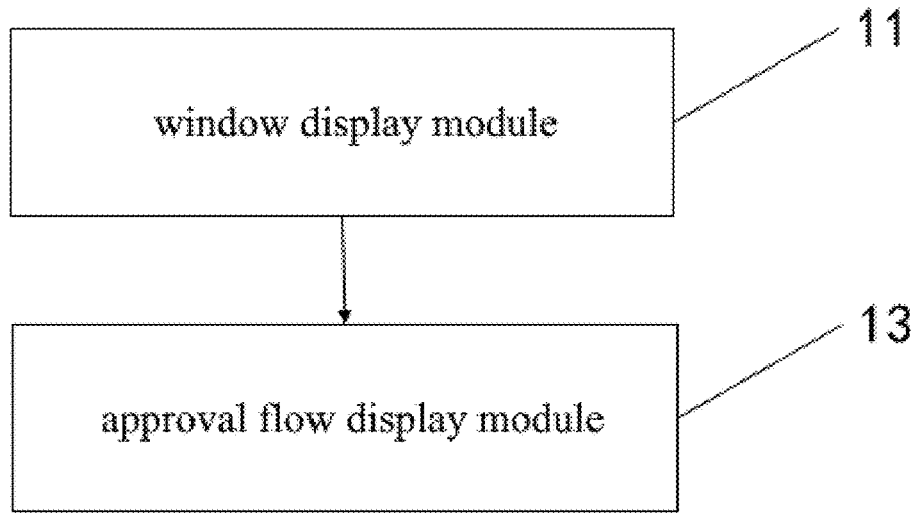
FIG. 4 illustrates a schematic diagram of an exemplary apparatus provided in an embodiment of the present disclosure.

With reference to FIG. 4, the data processing apparatus includes:
  a window display module 11 configured to, display a first window at a first position of the first document, where the first window includes an approval flow list in response to receiving a triggering operation on a first control in a first document; and
  an approval flow display module 13 configured to, display approval flow information of the first approval flow at the first position of the first document in response to receiving a selection operation on a first approval flow in the approval flow list.

In some embodiments, the data processing apparatus is further configured to: in response to receiving a triggering operation on the first position in the first document, display a second control at a second position in the first document, where the second position is adjacent to the first position; and
  in response to receiving a triggering operation on the second control, display the first control or a first list including the first control in the first document.

In some embodiments, the approval flow information includes an approval rule table or an approval rule flowchart;
  the approval rule table presents approval rule information of the first approval flow in a tabular form;
  the approval rule flowchart presents the approval rule information of the first approval flow in a flowchart form; and
  the approval rule information includes at least one selected from the group consisting of an approval sequence, an approval role, an approver, an approval type, or an approval condition.

In some embodiments, a third control is further displayed in the first document; and the data processing apparatus is further configured to:
  cancel displaying the approval rule table, and display the approval rule flowchart at the first position in response to displaying the approval rule table at the first position and receiving a triggering operation on the third control;
  or,
  cancel displaying the approval rule flowchart, and display the approval rule table at the first position in response to displaying the approval rule flowchart at the first position and receiving the triggering operation on the third control.

In some embodiments, the approval flow list includes at least one approval flow preset in an approval system.

In some embodiments, the first window includes an input box; and the data processing apparatus is further configured to: in response to receiving an input operation on the input box, obtain input information, and display one or more approval flows matching the input information in the approval flow list based on the input information.

In some embodiments, the data processing apparatus is further configured to: highlight, in the approval flow list, information matching the input information in the one or more approval flows.

In some embodiments, the data processing apparatus is further configured to: display, in the approval flow list, a name, a creator, and an editing time of the approval flow.

In some embodiments, the data processing apparatus is further configured to: in response to receiving an addition operation on the approval flow list, add a second approval flow to the approval flow list, and store the second approval flow in the approval system.

In some embodiments, the data processing apparatus is further configured to: in response to a current user of the first document having an editing authority for the first approval flow, display a fourth control in the first document; and in response to receiving a triggering operation on the fourth control, display an editing page of the first approval flow, where the editing page is used to implement an editing operation on the first approval flow.

In some embodiments, the data processing apparatus is further configured to: in response to receiving the editing operation on the first approval flow in the editing page, modify the approval flow information in the first document and approval flow information in the approval system based on an operation result of the editing operation.

In some embodiments, the data processing apparatus is further configured to: in response to the current user of the first document having an application authority for the first approval flow, display a fifth control in the first document; and
  in response to receiving a triggering operation on the fifth control, display an application page of the first approval flow, where the application page is used to implement an initiating application operation on the first approval flow.

In some embodiments, the data processing apparatus is further configured to: display the fifth control in the first document; and in response to receiving the triggering operation on the fifth control and the current user of the first document having the application authority for the first approval flow, display the application page of the first approval flow, where the application page is used to implement the initiating application operation on the first approval flow.

In some embodiments, the data processing apparatus is further configured to: in response to receiving the initiating application operation on the first approval flow in the application page, modify the approval flow information in the first document and the approval flow information in the approval system based on an operation result of the initiating application operation.

For ease of description, the data processing apparatus is divided into various modules based on functions for separate description. As a matter of course, functions of different modules may be implemented in one or more pieces of software and/or hardware during implementation of the present disclosure.

The data processing apparatus in the foregoing embodiments is configured to implement the corresponding data processing method in any of the foregoing embodiments, and has the beneficial effects of the corresponding method embodiments, which will not be described here redundantly.

Based on the same inventive concept, corresponding to the data processing method in any foregoing embodiment, the present disclosure further provides an electronic device, including a memory, a processor, and a computer program stored on the memory and executable on the processor, where the processor, when executing the computer program, implements the data processing method in any foregoing embodiment.

Figure 5:
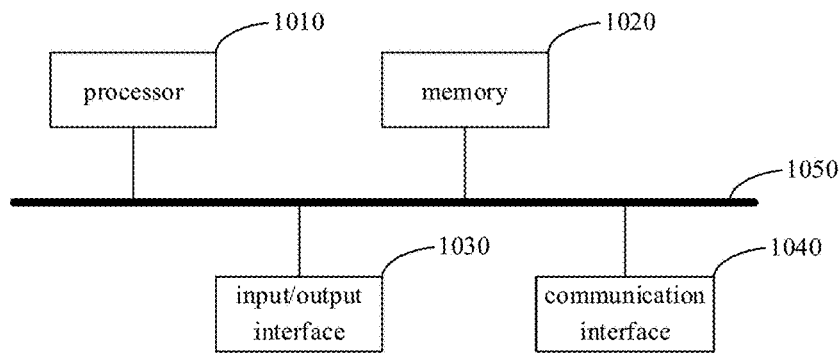
FIG. 5 illustrates a schematic diagram of a hardware structure of an exemplary computer device provided in an embodiment of the present disclosure.

FIG. 5 illustrates a schematic diagram of a hardware structure of a more specific electronic device provided in the present embodiment. The electronic device may include a processor 1010, a memory 1020, an input/output interface 1030, a communication interface 1040, and a bus 1050. The processor 1010, the memory 1020, the input/output interface 1030, and the communication interface 1040 are in communication connection with one another in the electronic device through the bus 1050.

The processor 1010 may be implemented by a general central flowing unit (CPU), a microprocessor, an application specific integrated circuit (ASIC), or one or more integrated circuits, and is configured to execute related programs to implement the technical solutions provided in the embodiments in the present description.

The 1020 may be implemented in the form of a read only memory (ROM), a random access memory (RAM), a static storage device, a dynamic storage device, etc. The memory 1020 may store an operating system and other application programs. When the technical solutions provided in the embodiments of the present description are implemented by software or firmware, related program code is stored in the memory 1020 called and executed by the processor 1010.

The input/output interface 1030 is configured to connect an input/output module to implement information input and output. The input/output/module can be configured in the device as a component (not shown in the figure), or it can be externally connected to the device to provide corresponding functions. Input devices may include a keyboard, a mouse, a touch screen, a microphone, various sensors, etc. Output devices may include a display, a speaker, a vibrator, an indicator light, etc.

The communication interface 1040 is configured to connect a communication module (not shown in the figure) to implement communication and interaction between the device and other devices. The communication module may implement communication in a wired manner (such as USB, network cable, etc.) or a wireless manner (such as mobile network, Wi-Fi, Bluetooth, etc.)

The bus 1050 includes a path for transmitting information between various components (such as the processor 1010, the memory 1020, the input/output interface 1030, and the communication interface 1040) of the electronic device.

It should be noted that although only the processor 1010, the memory 1020, the input/output interface 1030, the communication interface 1040, and the bus 1050 are shown for the device, in an implementation flow, the device may further include other components required for normal operation. In addition, those skilled in the art may understand that the device may include only components required for implementing the solutions in the embodiments of the present description, and not necessarily include all the components shown in the figure.

The electronic device in the foregoing embodiments is configured to implement the corresponding data processing method in any of the foregoing embodiments, and has the beneficial effects of the corresponding method embodiments, which will not be described here redundantly.

Based on the same inventive concept, corresponding to the data processing method in any foregoing embodiment, the present disclosure further provides a non-transitory computer-readable storage medium. The non-transitory computer-readable storage medium stores computer instructions for causing a computer to execute the data processing method in any foregoing embodiment.

The computer-readable medium in the present embodiment includes permanent and non-permanent, removable and non-removable media that can store information by any method or technique. The information may be computer-readable instructions, data structures, program modules, or other data. Examples of the storage medium of the computer include but are not limited to a phase-change RAM (PRAM), a static random access memory (SRAM), a dynamic random access memory (DRAM), other types of RAMs and ROMs, an electrically erasable programmable read-only memory (EEPROM), a flash memory or other memory techniques, a compact disk read-only memory (CD-ROM), a digital versatile disc (DVD), or other optical storage, a cassette type magnetic tape, magnetic tape disk storage, or other magnetic storage device, or nay other non-transmission medium, that can be used to store information accessible by computing devices.

The computer instructions stored on the storage medium in the above embodiment are used to cause the computer to execute the data processing method in any foregoing embodiment, and has the beneficial effects of the corresponding method embodiments, which will not be described here redundantly.

Based on the same inventive concept, corresponding to the data processing method in any foregoing embodiment, the present disclosure further provides a computer program product including a computer program. In some embodiments, the computer program is executable by one or more processors to cause the processor to execute the data processing method. Corresponding to a performing agent of each step in each method embodiment, a processor performing the corresponding step may belong to the corresponding performing agent.

The computer program product of the foregoing embodiment is configured to cause the processor to execute the data processing method in any foregoing embodiment, and has the beneficial effects of the corresponding method embodiments, which will not be described here redundantly.

Those of ordinary skill in the art should understand that the discussion of any of the above embodiments is only exemplary, and is not intended to imply that the scope of the present disclosure (including the claims) is limited to these examples. Under the idea of the present disclosure, the above embodiments or the technical features in different embodiments can also be combined, the steps can be implemented in any order, and many other changes in different aspects of the embodiments of the present disclosure are included, which are not provided in the details for brevity.

In addition, to simplify the description and discussion without making the embodiments of the present disclosure difficult to understand, the well-known power/ground connections to integrated circuit (IC) chips and other components may or may not be shown in the accompanying drawings. For ease of understanding of the embodiments of the present disclosure, apparatuses may be shown in the form of block diagrams. In addition, the details about the implementations of the apparatuses in the block diagrams are highly dependent on the platform on which the embodiments of the present disclosure will be implemented (that is, these details should be fully understandable to those skilled in the art). When specific details (for example, a circuit) are provided to describe the exemplary embodiments of the present disclosure, it is obvious that those skilled in the art can implement the embodiments of the present disclosure without these specific details or in case of any changes to these specific details. Therefore, these descriptions should be considered illustrative rather than restrictive.

Although the present disclosure has been described with reference to the specific embodiments of the present disclosure, many substitutions, modifications, and variations of these embodiments will be obvious to those of ordinary skill in the art based on the foregoing description. For example, other memory architectures, for example, a dynamic RAM (DRAM), can be used in the discussed embodiments.

The embodiments of the present disclosure are intended to cover all such substitutions, modifications, and variations that fall within the broad scope of the appended claims. Any omissions, modifications, equivalent substitutions, improvements, and the like made within the spirit and scope of the embodiments of the present disclosure should fall within the protection scope of the present disclosure.

What is claimed is:

1. A data processing method, comprising:
    displaying a first window at a first position of a first document in response to receiving a triggering operation on a first control in the first document, wherein the first window comprises an approval flow list; and
    displaying approval flow information of a first approval flow at the first position of the first document in response to receiving a selection operation on the first approval flow in the approval flow list.

2. The data processing method according to claim 1, before the receiving the triggering operation on the first control in the first document, further comprising:
    displaying a second control at a second position in the first document in response to receiving a triggering operation on the first position in the first document, wherein the second position is adjacent to the first position; and
    displaying the first control or a first list comprising the first control in the first document in response to receiving a triggering operation on the second control.

3. The data processing method according to claim 1, wherein the approval flow information comprises an approval rule table or an approval rule flowchart;
    the approval rule table presents approval rule information of the first approval flow in a tabular form;
    the approval rule flowchart presents the approval rule information of the first approval flow in a flowchart form; and
    the approval rule information comprises at least one selected from the group consisting of an approval sequence, an approval role, an approver, an approval type, or an approval condition.

4. The data processing method according to claim 3, wherein a third control is further displayed in the first document, and the data processing method further comprises:
    canceling displaying the approval rule table and displaying the approval rule flowchart at the first position in response to displaying the approval rule table at the first position and receiving a triggering operation on the third control;
    or,
    canceling displaying the approval rule flowchart and displaying the approval rule table at the first position in response to displaying the approval rule flowchart at the first position and receiving the triggering operation on the third control.

5. The data processing method according to claim 1, wherein the approval flow list comprises at least one approval flow preset in an approval system.

6. The data processing method according to claim 5, further comprising:
    displaying, in the approval flow list, a name, a creator, and an editing time of the approval flow.

7. The data processing method according to claim 1, wherein the first window comprises an input box; the data processing method further comprises:
    obtaining input information and displaying one or more approval flows matching the input information in the approval flow list based on the input information in response to receiving an input operation on the input box.

8. The data processing method according to claim 7, further comprising:
    highlighting, in the approval flow list, information matching the input information in one or more approval flows.

9. The data processing method according to claim 1, further comprising:
    adding a second approval flow to the approval flow list and storing the second approval flow in an approval system in response to receiving an addition operation on the approval flow list.

10. The data processing method according to claim 1, further comprising:
    displaying a fourth control in the first document in response to a current user of the first document having an editing authority for the first approval flow; and
    displaying an editing page of the first approval flow in response to receiving a triggering operation on the fourth control, wherein the editing page is used to implement an editing operation on the first approval flow.

11. The data processing method according to claim 10, further comprising:
    modifying the approval flow information in the first document and the approval flow information in an approval system based on an operation result of the editing operation in response to receiving the editing operation on the first approval flow in the editing page.

12. The data processing method according to claim 1, further comprising:
    displaying a fifth control in the first document in response to a current user of the first document having an application authority for the first approval flow; and
    displaying an application page of the first approval flow in response to receiving a triggering operation on the fifth control, wherein the application page is used to implement an initiating application operation on the first approval flow.

13. The data processing method according to claim 12, further comprising:
modifying the approval flow information in the first document and the approval flow information in an approval system based on an operation result of the initiating application operation in response to receiving the initiating application operation on the first approval flow in the application page.

14. The data processing method according to claim 1, further comprising:
displaying a fifth control in the first document; and
displaying the application page of the first approval flow in response to receiving a triggering operation on the fifth control and a current user of the first document having the application authority for the first approval flow, wherein the application page is used to implement an initiating application operation on the first approval flow.

15. A non-transitory computer-readable storage medium storing computer instructions, wherein the computer instructions are used for causing a computer to execute the data processing method according to claim 1.

16. A data processing apparatus, comprising:
a window display module configured to: display a first window at a first position of a first document in response to receiving a triggering operation on a first control in the first document, wherein the first window comprises an approval flow list; and
an approval flow display module configured to: display approval flow information of a first approval flow at the first position of the first document in response to receiving a selection operation on the first approval flow in the approval flow list.

17. The data processing apparatus according to claim 16, wherein the approval flow information comprises an approval rule table or an approval rule flowchart;
the approval rule table presents approval rule information of the first approval flow in a tabular form;
the approval rule flowchart presents the approval rule information of the first approval flow in a flowchart form; and
the approval rule information comprises at least one selected from the group consisting of an approval sequence, an approval role, an approver, an approval type, or an approval condition.

18. An electronic device, comprising a memory, at least one processor, and a computer program stored on the memory and executable on the at least one processor, wherein the at least one processor, when executing the computer program, implements a data processing method, wherein the data processing method comprises:
displaying a first window at a first position of a first document in response to receiving a triggering operation on a first control in the first document, wherein the first window comprises an approval flow list; and
displaying approval flow information of a first approval flow at the first position of the first document in response to receiving a selection operation on the first approval flow in the approval flow list.

19. The data processing device according to claim 18, wherein the processor, when executing the computer program, further implements:
displaying a second control at a second position in the first document in response to receiving a triggering operation on the first position in the first document, wherein the second position is adjacent to the first position; and
displaying the first control or a first list comprising the first control in the first document in response to receiving a triggering operation on the second control.

20. The data processing device according to claim 18, wherein the approval flow information comprises an approval rule table or an approval rule flowchart;
the approval rule table presents approval rule information of the first approval flow in a tabular form;
the approval rule flowchart presents the approval rule information of the first approval flow in a flowchart form; and
the approval rule information comprises at least one selected from the group consisting of an approval sequence, an approval role, an approver, an approval type, or an approval condition.

* * * * *